United States Patent [19]

Veale

[11] 4,429,267
[45] Jan. 31, 1984

[54] DIGITAL POSITIONING SYSTEMS HAVING HIGH ACCURACY

[75] Inventor: John R. Veale, Manhattan Beach, Calif.

[73] Assignee: Manhattan Engineering Company, Inc., Manhattan Beach, Calif.

[21] Appl. No.: 275,926

[22] Filed: Jun. 22, 1981

[51] Int. Cl.³ .............................................. G05B 11/18
[52] U.S. Cl. .................................... 318/594; 318/603; 318/640
[58] Field of Search ............... 318/594, 592, 640, 603, 318/608

[56] References Cited

U.S. PATENT DOCUMENTS

| | | | |
|---|---|---|---|
| 3,020,460 | 2/1962 | Morin et al. | 318/594 |
| 3,327,101 | 6/1967 | Evans | 318/594 X |
| 3,473,098 | 10/1969 | Waller | 318/594 |
| 3,536,979 | 10/1970 | Reuteler et al. | 318/594 X |

Primary Examiner—B. Dobeck
Attorney, Agent, or Firm—Robert J. Schaap

[57] ABSTRACT

A digital positioning system having high accuracy is disclosed, which employs an incremental position optical encoder as the position transducer. In response to the output signal from the encoder, the system provides coarse and fine position signals which are combined to form a composite digital signal representing the absolute position of a moveable control member. The composite position signal has a resolution of greater than one part in one million. Trigonometric conversion techniques are used to derive high resolution incremental position information from the encoder output signals.

18 Claims, 11 Drawing Figures

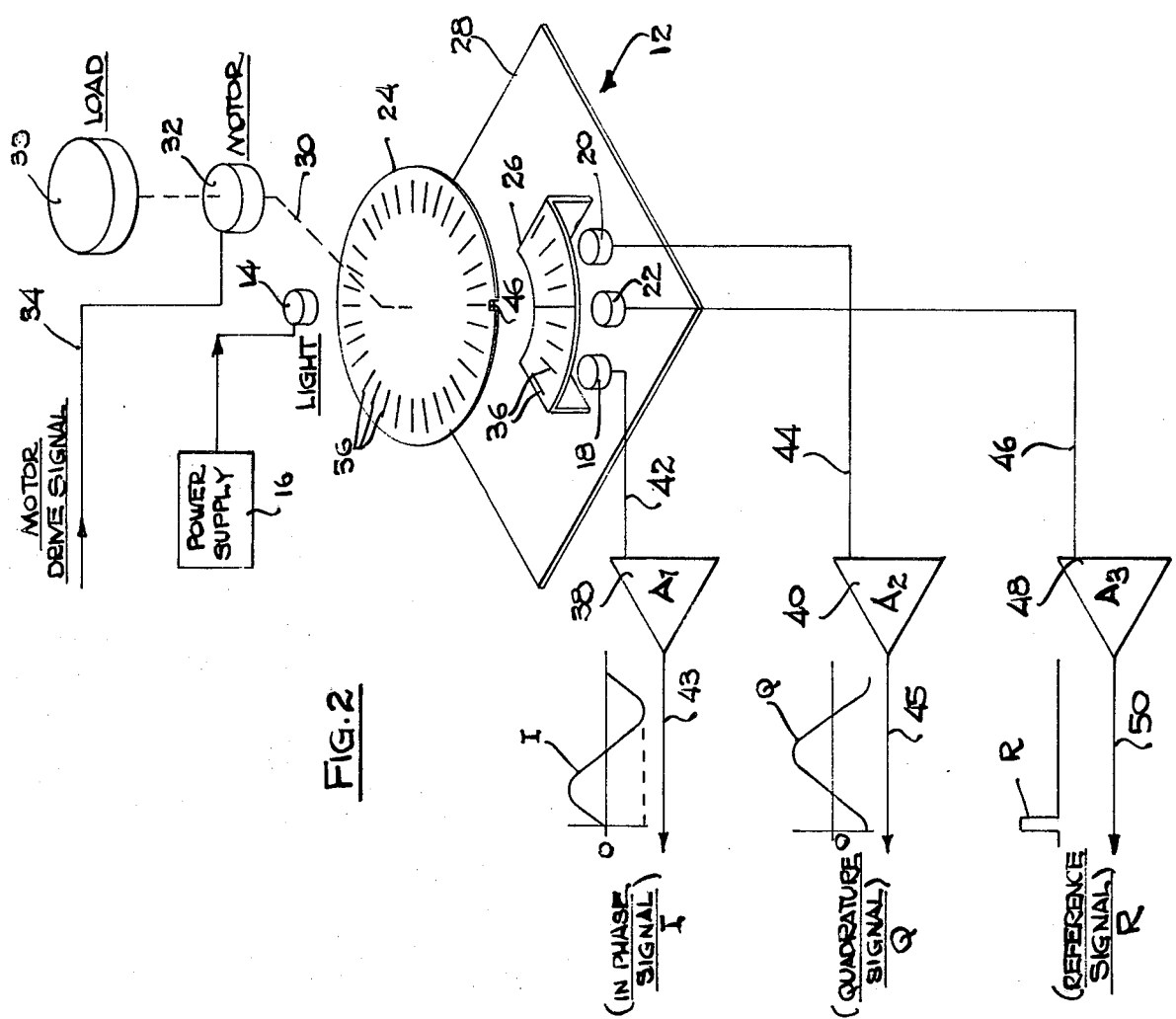
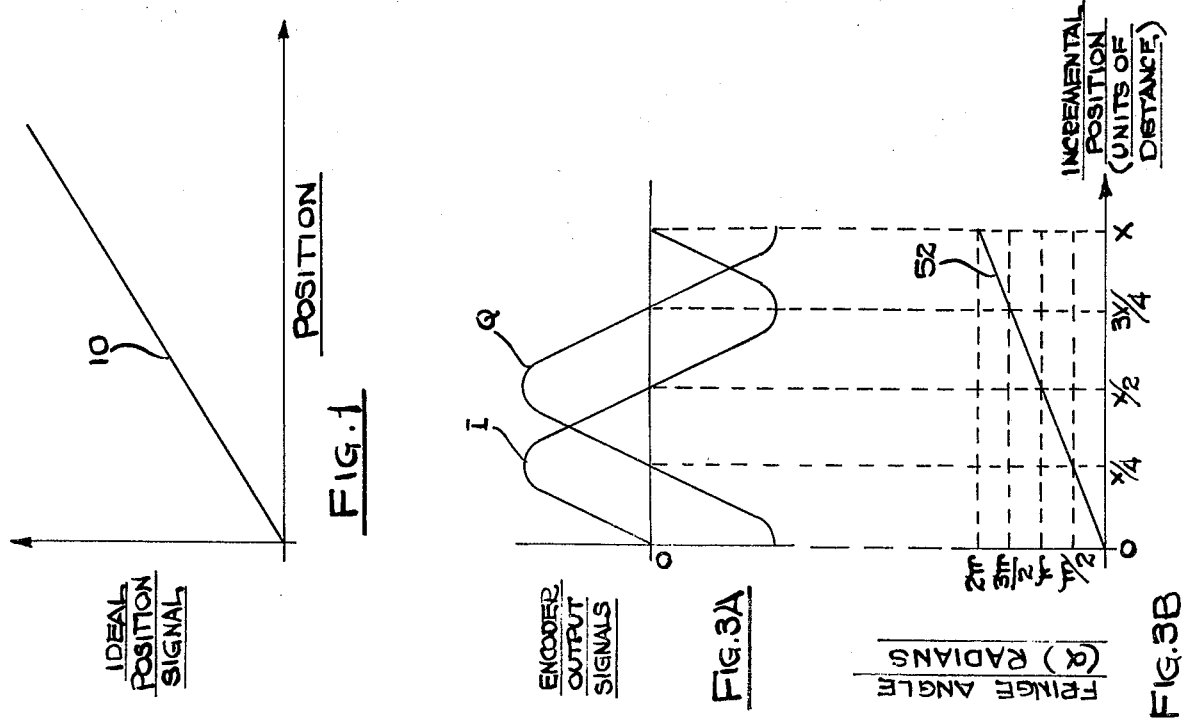

DIGITAL POSITIONING SYSTEMS HAVING HIGH ACCURACY

BACKGROUND OF THE INVENTION

This invention relates to digital positioning systems and more particularly to digital positioning systems capable of high positioning accuracy and which may be produced inexpensively for use in industrial and commercial applications.

High accuracy positioning systems have been used for many years in a variety of military and aerospace applications to position moveable control members. Such applications include the positioning of antennas and optical sensors.

A key element in any positioning system is the position transducer used to sense the position of the moveable control element since the overall performance of the positioning system is a function of the accuracy, repeatability and linearity of the position transducer. Historically, many types of transducers have been employed to measure position such as potentiometers, resolvers, differential transformers, magnetic encoders, optical encoders and the like.

Optical shaft encoders have found widespread use as position transducers in high accuracy positioning systems. In particular, absolute position optical encoders are employed to obtain the high resolution necessary for accurate positioning. These types of encoders include a light source such as a light emitting diode, a group of photo-sensors such as photo-diodes, and a coded disk positioned between the light source and the photo-sensors. If the control element to be positioned is the shaft of a motor, the coded disk is rotatably mounted to the motor shaft. The coded disk includes patterns of clear and opaque segments which vary in size and location according to the resolution required by the application. The patterns are arranged so that light passes from the light source through the clear segments of the disk and illuminates the photo sensors in a prescribed manner whereby the photo sensor output signals form a binary representation of the absolute position of the motor shaft.

The coded disk is usually formed of glass and the patterns are photographically imprinted on the disk to create the clear and opaque areas. As the disk rotates with the motor shaft, the photo sensors detect the absence or presence of light as a function of both the disk patterns and the position of the disk. The disk patterns are configured so that the photo sensor output signals may be combined to form a digital number using a code such as binary coded decimal or gray binary code. The resolution of the encoder determines the number of bits required in the digital number.

The size of the disk, the required accuracy of the pattern, and the required number of photo sensors all increase as the resolution requirement of the encoder increases. For example, to resolve one revolution of the motor shaft into a thousand parts requires a coded disk of approximately two and one-half inches in diameter and ten photo sensors. Higher resolutions require larger disks, extremely accurate patterns, and a proportionately greater number of photo sensors. The mechanical alignment of the disk, light source and photo sensors also becomes a critical factor in higher resolution encoders. Because of the critical alignment requirements, as well as the large number of components employed in their construction, absolute position optical encoders are expensive to produce. Accordingly, the use of these encoders has been limited primarily to military and aerospace applications as opposed to commercial and industrial applications.

Another type of optical encoder which has found widespread use in positioning systems is the incremental position encoder. Incremental position encoders are less expensive to produce than absolute position encoders, but suffer from limited resolution. This type of encoder also employs a light source and a group of photo sensors. Mounted in a parallel, spaced-apart relationship between the light source and the photo sensors are a moveable disk and a fixed reticle. The disk is mounted to the moveable control element such as a motor shaft. The disk and the reticle are each provided with a pattern of clear apertures and opaque areas. As the moveable disk rotates with the motor shaft, light paths from the light source to the photo sensors are created by the juxtaposition of the apertures in the disk and reticle. The light paths are detected by the photo sensors which are positioned with respect to the reticle to create two output signals in response to the rotation of the moving disk. These two signals are typically in the form of sine or square waves displaced in phase ninety degrees with respect to each other. Each of the sine or square waves represents the incremental rotation of the moveable disk by a distance equal to the spacings between apertures.

Counting the number of sine or square waves that occur as the motor shaft rotates provides a determination of the position of the shaft. Prior art techniques have also been developed for counting the number of zero crossings which occur in the encoder output signals. These techniques permit resolving the position of the motor shaft into four parts for each of the apertures in the disk pattern. The resolution thus obtainable in the use of incremental shaft encoders has been limited to four times the number of apertures which can be formed by the pattern on the disks. Incremental encoders are typically limited to disk patterns having a maximum of two thousand five hundred apertures. Increasing the number of apertures beyond this number is impractical because of the extremely accurate tolerances required in the manufacture and assembly of such encoders. Resolving each of the apertures into four parts as described above results in a resolution of one part in ten thousand using incremental position encoders. On the other hand, high accuracy positioning systems may require resolutions of one part in one million. Therefore, incremental encoders have been limited in use to positioning systems which do not require high positioning accuracy.

Accordingly, it is an object of the present invention to provide a new and improved digital positioning system having high accuracy.

It is another object of the present invention to provide a digital positioning system which possesses high positioning accuracy and which uses an incremental position optical encoder as a position transducer.

It is still another object of the present invention to provide a digital positioning system which is capable of generating a highly accurate digital position signal in response to the output signals from an incremental position optical encoder.

SUMMARY OF THE INVENTION

The foregoing and other objects of the invention are accomplished by a digital positioning system which employs an incremental position optical encoder as a position transducer. The incremental encoder employs a light source, photo sensors, a moveable disk and a fixed reticle. The disk and reticle are positioned in spaced-apart relationship between the light source and the photo sensors. The moveable disk is mounted to the output shaft of a dynamically moveable drive member, in the form of a motor, controlled by the digital positioning system. Also mounted to the motor shaft is a control member to be positioned by the positioning system. The position of the moveable disk corresponds to the position of the control member. The disk and reticle are both provided with a pattern of clear and opaque areas. The clear areas are in the form of narrow apertures spaced apart around the periphery of the disks. As the moveable disk rotates with the output shaft of the motor, light paths from the light source to the photo sensors are created in the form of Moire fringes by the juxtaposition of the apertures on the disk and reticle. The light source and photo sensors are positioned to detect these fringes which occur in a periodic pattern in response to the rotation of the moving disk. Each fringe corresponds to the rotation of the moveable disk a distance equal to the spacing between adjacent apertures. The photo sensors are positioned to provide two output signals in response to the light from the light source; an in-phase signal and a quadrature signal. The in-phase signal is in the form of a sine wave where one full cycle corresponds to the rotation of the moveable disk over an incremental distance of one fringe. The quadrature signal is in the form of a cosine wave displaced in phase by ninety degrees relative to the in-phase signal. One full cycle of the cosine wave also corresponds to the moveable disk rotating an incremental distance of one fringe. A third signal is also provided from the incremental encoder in the form of a single pulse which occurs once per full revolution of the output shaft of the motor. This pulse signal corresponds to an index or reference position of the motor shaft.

In response to the in-phase, quadrature aand reference signals from the incremental encoder, the digital positioning system provides a coarse position signal in the form of a binary number. This binary number is proportional to the number of fringes created by the rotation of the moveable disk from the reference position and represents the angular position of the control member resolved to within the distance of one fringe.

In the response to the in-phase and quadrature signals from the incremental encoder, the digital positioning system also provides a fine position signal in the form of a binary number. This binary number represents the angular incremental position of the control member within a single fringe. The determination of the position of the control member within a fringe is based on the fact that the in-phase and quadrature signals represent the sine and cosine, respectively, of a fringe angle which is proportional to the position of the moveable disk within that fringe. This fringe angle is arrived at by first generating the tangent of the fringe angle. The tangent of the fringe angle is generated by means of all digital circuitry. The fringe angle is determined from the tangent of the angle by means of arc-tangent conversion techniques. The fringe angle is combined with the known width of a fringe to arrive at a digital number representing the fine position of the motor shaft.

The digital positioning system combines the coarse and fine position signals to arrive at a composite position signal representing the absolute angular position of the control member and having a resolution of better than one part in one million. The digital composite position signal is compared to a digital position command signal representing the desired position of the control member. A digital error signal is created proportional to the difference between the command signal and the composite signal. This position error signal is used to provide an output signal to drive the motor to position the control member at the desired command position.

The digital positioning system of the present invention also includes means for calculating the velocity of the control member from the composite position signal. The velocity of the control member is compared to a stored velocity profile which is a function of position error, and a velocity error signal is generated. The velocity error signal is combined with the position error signal to create both position and velocity feedback loops in the positioning system.

All of the functions described above are performed using digital circuitry. The result is a digital positioning system capable of extremely high positioning accuracy due in part to the unique means for creating a high resolution absolute position signal in digital form from a low cost incremental optical shaft encoder.

These and other objects, features and advantages of the invention will become apparent from the reading of the specification when taken in conjunction with the drawings in which like reference numerals refer to like elements in the several figures.

BRIEF DESCRIPTION OF THE DRAWINGS

FIG. 1 is a graphic illustrations of an ideal position signal for use in a positioning system.

FIG. 2 is a schematic illustration showing an incremental position optical shaft encoder used in the digital positioning system of the present invention and output waveforms generated therefrom;

FIGS. 3A and 3B are graphic illustrations showing the output signals of the encoder of FIG. 2 in relation to the angle within a fringe produced by the encoder; the illustrations being shown as a function of the position of the output shaft of a motor which is controlled by the digital positioning system of the present invention;

DESCRIPTION OF THE PREFERRED EMBODIMENT

Figure 4:
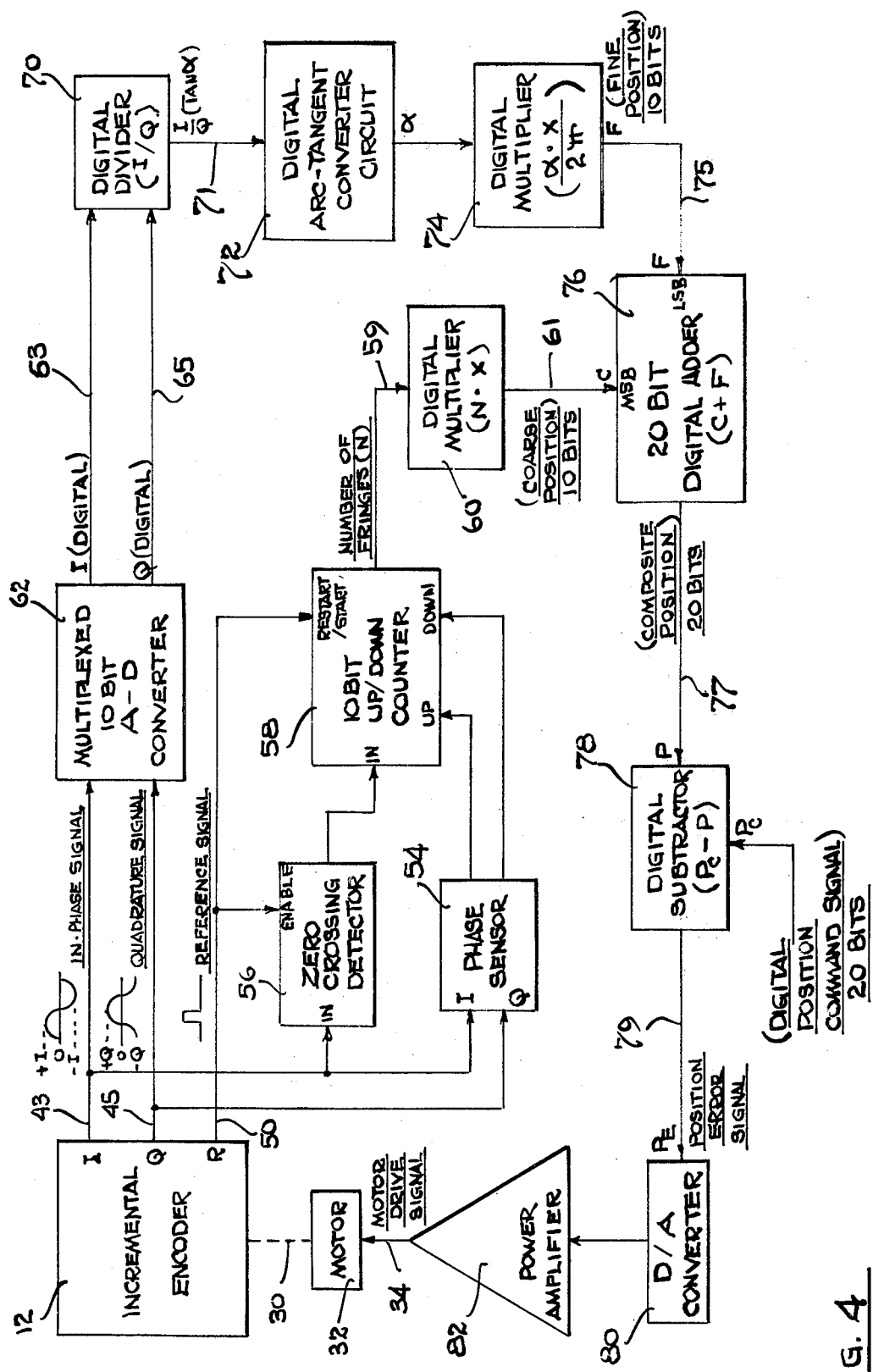
FIG. 4 is a block diagram showing the major components of the digital positioning system of the present invention.

Referring to FIG. 1, there is shown a graphic illustration of an ideal position signal 10 for use in a positioning system. In any system used for the accurate positioning of a moveable control element, it is required that a signal be provided which is representative of the position of that control element. The accuracy of the positioning system is, in turn, limited by the accuracy, linearity and resolution of this position signal. FIG. 1 shows an analog position signal 10 which is representative of the absolute position of the moveable control element. In digital positioning systems, the infinite resolution analog positioning signal 10 shown in FIG. 1 is represented by a series of binary numbers where each number corresponds to the absolute position of the moveable control element. The resolution of this digital position signal is a function of the number of bits in the binary number. For example, a ten-bit binary number is capable of resolving position to approximately one part in one thousand, while a twenty-bit binary number is capable of resolving position to approximately one part in one million.

FIG. 2 illustrates the operation of an incremental position optical shaft encoder 12 used in the digital positioning system of the present invention. The encoder 12 includes a light source 14 which may be in the form of a light-emitting diode and which is illuminated by a power supply 16. A group of photo sensors 18, 20 and 22 are positioned to receive light from the light source 14. Mounted between the light source 14 and the photo sensors 18, 20 and 22 are a moveable disk 24 and a fixed reticle 26. The fixed reticle 26 is mounted to a frame 28 of the encoder 12 which also supports the light source 14 and the photo sensors 18, 20 and 22. The moveable disk 24 is axially mounted to one end of output shaft 30 of a dynamically moveable drive member in the form of a motor 32. A moveable control member or load 33 is mounted to the opposite end of the shaft 30. The motor 32 is driven by a motor drive signal on line 34 in response to the digital positioning system control electronics to position the control member 33 as described below.

The disk 24 and the reticle 26 may each be constructed of thin sheets of glass. The surfaces of each are provided with patterns of equally spaced clear and opaque segments which may be formed by means such as photographic imprinting. The clear segments are in the form of angularly disposed and equally spaced narrow apertures 36. Except for an aperture 46 provided on the disk 24 as described below, the remainder of the surfaces of the disk 24 and the reticle 26 are opaque. The disk 24 and the reticle 26 are positioned in parallel spaced-apart relationship with typically ten mils of clearance provided between them.

Energizing the motor 32 causes the moveable disk 24 to rotate with respect to the reticle 26. The relative orientation of the apertures 36 of the disk 24 and the reticle 26 produce light paths from the light source 14 to the photo sensors 18 and 20 in the form of Moire fringes which occur in a periodic pattern in response to the rotation of the disk 24. These fringes are detected by the photo sensors 18 and 20 in response to the light rays emitted from the light source 14 and which pass through selected apertures 36 in the disk 24 and the reticle 26 in response to the angular position of the moveable disk 24 and, hence, the position of the member 33. Rotation of the moveable disk 24 by an amount equal to the distance between adjacent apertures 36 creates a single fringe. In a manner well known to those skilled in the art, for constant speed rotation of the motor shaft 30, the fringes are created in succession corresponding to the equal spacing of the apertures 36 around the periphery of the disk 24. The photo sensors 18 and 20 are positioned with respect to the reticle 26 so that light received by these sensors produces an in-phase signal at output line 42 of the photo sensor 18 and produces a quadrature signal at output line 44 of the photo sensor 20.

As shown in FIG. 2, the output signals from the photo sensors 18 and 20, which are typically in the form of photo diodes, are amplified, respectively, by the amplifiers 38 and 40, resulting in in-phase and quadrature signals shown by wave forms I and Q, appearing at lines 43 and 45, respectively. The wave form I is in the shape of a sine wave with one full cycle of the sine wave being generated in response to each fringe created by the movement of the disk 24. Similarly, the waveform Q is in the form of a cosine wave with one full cycle of the cosine wave being generated in response to each fringe.

In addition to the in-phase and quadrature signals I and Q, the encoder 12 provides a third signal in the following manner. As shown in FIG. 2, the disk 24 is provided with a single aperture 46 which is positioned separate and apart from the apertures 36 described above. The aperture 46 is employed in conjunction with the light source 14 and the photo sensor 22 to detect a unique reference position of the moveable disk 24 in relation to the frame 28, and the reticle 26. When the moveable disk 24 is in a position where the single aperture 46 is aligned with the photo sensor 22, a light path is established from the light source 14 to the photo sensor 22. The signal at output line 46 of the photo sensor 22 is amplified by amplifier 48 to produce a reference signal in the form of a pulse as shown by waveform R appearing at line 50. From the above description it is apparent that the pulse shown in waveform R is only generated when the moveable disk 24 is in a unique position once per revolution with respect to the reticle 26. The signal on the line 50 is used to establish an index or reference position for the output shaft 30 of the motor 32.

A variety of incremental position optical shaft encoders 12 of the type described above are commercially available, such as encoder type R-1500, manufactured by Electro-Craft Corporation, Hopkins, Minn. and encoder type L-25, manufactured by BEI Electronics, Inc., Little Rock, Ark. Such incremental encoders are capable of providing as many as two thousand five hundred fringes for a single rotation of the movable disk 24. These encoders are designed to be used to sense position by counting the number of fringes generated as the disk 24 rotates. However, this approach does not provide sufficient resolution to enable the encoder 12 to be used as a position transducer for high accuracy positioning systems which may require resolutions as high as one part in one million for one revolution of the motor shaft 30. As described below, the digital positioning system of the present invention is capable of providing the high resolution absolute position signal required for high accuracy positioning in response to the output signal waveforms I, Q and R from the incremental encoder 12.

FIG. 3A is a graphic illustration of the waveforms of the in-phase signal I and the quadrature signal Q from the encoder 12, both plotted on a common horizontal axis representing the position of the moveable disk 24. The waveforms shown in FIG. 3A represent the output signals I and Q produced when the disk 24 moves from a zero position corresponding to the beginning of a fringe, to a position X corresponding to the end of a fringe. Accordingly, the incremental distance X represents the width of a single fringe, and is equivalent to the spacing between adjacent apertures 36 of the disk 24. The waveforms I and Q in FIG. 3A are seen to represent sine and consine waves, respectively, which are separated in phase by ninety degrees. It is a feature of the incremental encoder 12 that the phase relationship between the signals I and Q is a function of the direction of rotation of the moveable disk 24 relative to the reticle 26. For example, the encoder 12 may be configured so that clockwise rotation of the moveable disk 24 causes the signal Q to lag the signal I by ninety degrees as illustrated in FIG. 3A. Accordingly, counter-clockwise rotation of the disk 24 causes the opposite result with the signal Q leading the signal I by ninety degrees in phase. This relationship between the direction of motion of the disk 24 and the relative phase of the signals I and Q is used by the digital positioning system to determine the direction of rotation of the motor shaft 30 as described below.

As an aid in the understanding of the operation of the digital positioning system of the present invention, the incremental distance X, which corresponds to the width of a single fringe and is normally thought of in units of distance, may also be thought of in angular units. This concept is illustrated by curve 52 in FIG. 3B. Curve 52, which is plotted relative to the same horizontal position axis as the curves of FIG. 3A, illustrates the linear relationship between a fringe angle $\alpha$ and the various positions of the disk 24 within a fringe. The fringe angle $\alpha$ is based on the concept that the in-phase signal I is in the form of a sine wave which represents both the incremental distance X as well as $2\pi$ radians of the spatial fringe angle $\alpha$. Accordingly, the angle $\alpha$ is related to the position of the moveable disk 24 within a fringe by the linear relationship shown in curve 52 of FIG. 3B where the angle of $2\pi$ radians corresponds to the distance X.

The dotted lines in FIGS. 3A and 3B show the interrelationships between the signals I and Q, the fringe angle $\alpha$ and the position of the moveable disk 24 within a fringe. From these relationships it can be seen that the in-phase signal I represents the sine of the angle $\alpha$ and the quadrature signal Q represents the cosine of the angle $\alpha$, and further, that the angle $\alpha$ is a linear representation of the incremental position of the disk 24 within a single fringe. The above-described relationships between the signals I and Q and the incremental position of the moveable disk 24 within a fringe are employed by the digital positioning system of the present invention to provide a digital signal representative of the absolute position of the disk 24, and hence, the moveable meber 33, and having a resolution heretofore unattainable from incremental encoders. This highly accurate absolute position signal is composed of two parts. The first part represents a coarse position signal and is arrived at by counting the number of fringes past which the moveable disk 24 has rotated in response to the signals I, Q and R from the encoder 12. This coarse position signal thus represents the position of the output shaft 30 of the motor 32, resolved to within the incremental distance X of one fringe.

The second part of the composite position signal is a fine position signal representing the incremental position of the disk 24 within a single fringe. The fine position signal is arrived at by deriving the fringe angle $\alpha$ in response to the signals I and Q from the encoder 12. The incremental position of the disk 24 within a fringe is then determined using the relationship between the fringe angle $\alpha$ and incremental position as shown by the curve 52 in FIG. 3B. The fine and coarse position signals are combined to provide a composite position signal representing the absolute position of the control member 33 to within a resolution of better than one part in one million.

Referring now to FIG. 4 there is shown a block diagram of the digital positioning system of the present invention. The coarse position signal referred to above is derived in response to the output signals I, Q and R of the incremental encoder 12 in the following manner. The in-phase and quadrature signals I and Q appearing on encoder 12 output lines 43 and 45 are provided as input signals to a phase sensor 54. The in-phase signal I is also provided as an input signal to a zero crossing detector 56. The output signal of the zero crossing detector 56 is provided as an input signal to a ten-bit up/down counter 58. Output signals from the phase sensor 54 are also provided as input signals to the counter 58 and are used to direct the counter 58 to count either in an up direction or down direction. The reference output signal R from the encoder 12 is provided as a reset/start input signal to the counter 58.

In the operation of the system thus described, the zero-crossing detector 56 is used to detect each zero-crossing of the in-phase signal I which occurs after the pulse reference signal R is generated by the encoder 12. The detector 56 provides an output signal waveform comprising one pulse for every two zero-crossings of the signal I. The relationship between the reference signal R and the signals I and Q of the encoder 12 is graphically illustrated by the waveforms shown in FIG. 5A. FIGS. 5A through 5E are all plotted as a function of the absolute position of the moveable disk 24 beginning from a zero position corresponding to the reference or index position of the disk 24. Referring to FIG. 2, this reference position corresponds to the alignment of the single aperture 46 in the disk 24 as sensed by the photo sensor 22.

Figure 5A:
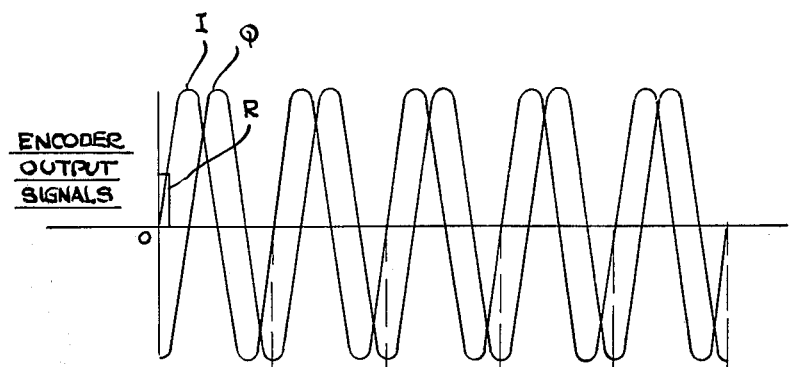
FIGS. 5A–5E are graphic illustrations showing various signals produced in the operation of the digital positioning system of FIG. 4.
Figure 5B:
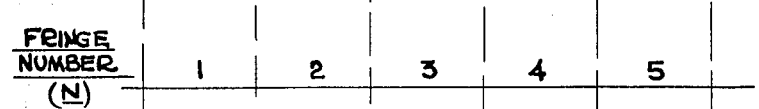

Returning to FIG. 5A, the pulse R generated by the photosensor 22 is shown as occurring at the zero or reference position of the disk 24. Analysis of the signal waveform I in FIG. 5A shows that counting every other zero crossing of the waveform I after the occurrence of the pulse R is equivalent to counting the number of full cycles of sine waves. This number represents the number of fringes past which the disk 24 has rotated from the reference position. The waveforms illustrated in FIG. 5A represent the rotation of the disk 24 past five fringes which are numbered sequentially in FIG. 5B.

Returning to FIG. 4, and from the above discussion, it can be seen that the output signal from the detector 56 is in the form of a pulse for each fringe past which the disk 24 has rotated. These pulses are counted by the up/down counter 58 which is started by the pulse reference signal R. The counter 58 is directed to either count up or down depending on whether the moveable disk 24 is rotating clockwise or counter-clockwise. The rotation direction of the disk 24 is determined by the phase sensor 54 in response to the signals I and Q. As described above, the phase relationship between the signals I and Q is a function of the direction of rotation of the disk 24. This phase relationship is detected by the sensor 54 which provides output signals directing the counter 58 to either count up or down.

Figure 5C:
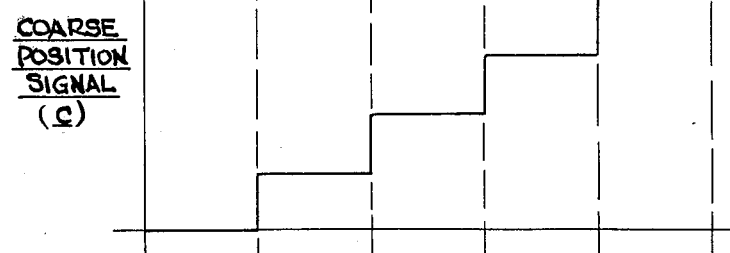

The output signal of the counter 58 appearing on line 59 is in the form of a ten-bit binary number representing the number of fringes N past which the disk 24 has rotated from the reference position. Each fringe represents the incremental distance X between adjacent apertures in disk 24. Accordingly, multiplying the number of fringes N by the fixed distance X, which is accomplished by a digital multiplier 60, provides a coarse position signal C appearing on line 61 in the form of a ten-bit binary number representing the absolute position of the moveable disk 24 resolved to within the distance of one fringe. An analog representation of the coarse position signal C as the disk 24 rotates past five fringes is shown in FIG. 5C. From this figure it can be seen that the coarse position signal C is a step-wise discontinuous signal having a resolution of one fringe.

The fine position signal, referred to above as representing the incremental position of the disk 24 within a single fringe, is derived in response to the signals I and Q from the encoder 12 in the following manner. The fringe angle $\alpha$ is determined by dividing the signal I which represents sine $\alpha$ by the signal Q which represents cosine $\alpha$. Dividing the sine of an angle by its cosine yields the tangent of that angle. Accordingly, dividing the signal I by the signal Q provides a signal representing the tangent of the fringe angle $\alpha$. The angle $\alpha$ is in turn derived by means of an arc-tangent converter responsive to the signal representing the tangent $\alpha$.

It has been found that the means described above for obtaining the angle $\alpha$ in response to the signals I and Q provides higher accuracy than alternative means employing only one of the signals I or Q. For example, since the signal I represents sine $\alpha$, it is possible to derive the angle $\alpha$ from the signal I by means of an arc-sine converter. Similarly, the angle $\alpha$ could be derived from the signal Q by means of an arc-cosine converter. However, due to manufacturing tolerances in the construction of incremental encoders 12, the signals I and Q include errors in both amplitude and phase. Referring to FIG. 2, these errors can occur as a result of manufacturing tolerances in the shape and orientation of the apertures 36 of the disk 24 and reticle 26, and may also be caused by errors in the placement of the photo sensors 18 and 20. It has been found that the errors which occur in the signals I and Q tend to be of the same polarity and of approximately the same magnitude in both of these signals. Thus, by dividing the signal I by the signal Q to obtain the tangent of the fringe angle $\alpha$, several of the errors are cancelled, resulting in a more accurate determination of the angle $\alpha$.

Referring now to FIG. 4, the signals I and Q appearing on the lines 43 and 45 from the incremental encoder 12 are in analog form as shown in FIGS. 3A and 5A. Each of these signals is converted to digital form by means of a multiplexed ten-bit analog-to-digital converter 62. The signals I and Q are provided as input signals to the converter 62, which is capable of converting the two analog signals to two digital signals, each represented by a ten-bit binary number. The converter 62 must be of sufficiently high speed to provide accurate conversion of the signals I and Q at the maximum rate of rotation of the output shaft 30 of the motor 32.

The digitized signals I and Q, which represent, respectively, the sine and cosine of the fringe angle $\alpha$, appear on lines 53 and 65 and are provided as input signals to a digital divider 70. The digital divider 70 divides the signal I by the signal Q to create an output signal representing the tangent of the fringe angle $\alpha$. This signal representing tan $\alpha$ appears on line 71 and is provided as an input signal to a digital arc-tangent converter circuit 72 which provides an output signal which is the arc tangent of the input signal. Accordingly, the output signal from the converter 72 represents the fringe angle $\alpha$. The fringe angle $\alpha$ is converted into units of position as a function of the relationship illustrated by the curve 52 in FIG. 3B, which shows that $2\pi$ radians of the angle $\alpha$ is equivalent to the incremental distance X. A digital multiplier 74, shown in FIG. 4, employs this relationship by multiplying the input signal $\alpha$ by the distance X and dividing the result by $2\pi$ radians.

Figure 5D:
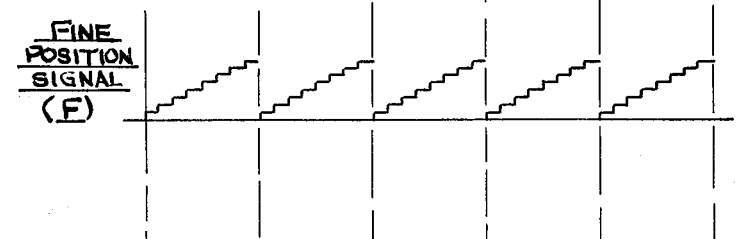

Output signal F appearing on line 75 from the multiplier 74 is a digital representation of the incremental position of the moveable disk 24 within a single fringe, and is the fine position signal described above in the form of a ten-bit binary number. An analog representation of the fine position signal F is shown in FIG. 5D. As the moveable disk 24 rotates past each fringe, the signal F as calculated in the manner described above represents the incremental position of the disk 24 within each fringe. Thus, the value of the signal F varies from the value zero at the beginning of a fringe to the value X at the end of a fringe. While FIG. 5D shows the position signal F resolved into only eight steps for each fringe, in practice, the ten-bit binary number used to represent the signal F provides resolution of the incremental position of the disk 24 within a single fringe to better than one part in one thousand.

The coarse position signal C appearing on the line 61 and the fine position signal F appearing on the line 75 are combined by the digital positioning system of the present invention to provide a digital composite position signal P representing the absolute position of the moveable disk 24. Referring to FIG. 4, the signals C and F are provided as input signals to a twenty-bit digital adder 76. The signals C and F are added so that the ten bits which form the coarse position signal C represent the ten most significant bits in the adder 76, and the ten bits which form the signal F represent the ten least significant bits in the adder 76. Accordingly, the adder 76 provides an output signal P on line 77 in the form of a twenty-bit binary number representing the absolute position of the moveable disk 24 and consequently of the moveable control member 33.

Figure 5E:
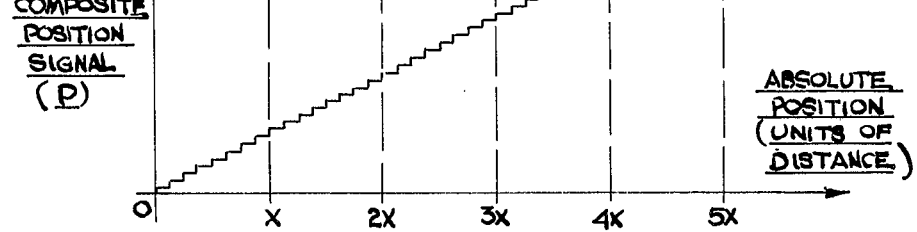

An analog representation of the composite position signal P is shown in FIG. 5E, which is the result of combining the curves shown in FIGS. 5C and 5D. Comparing FIG. 5E to FIG. 1, it can be seen that the digital positioning system of the present invention has created a digital representation of the absolute position of the moveable control member 33 which approaches the ideal position signal shown in FIG. 1. It should be noted that while FIG. 5E shows only eight part resolution for each fringe, the twenty-bit signal P is capable of resolving the absolute position of the member 33 to better than one part in one million.

The digital positioning system of the present invention employs the composite position signal P as part of a closed-loop control system to accurately position the control member 33 in the following manner. Referring to FIG. 4, the position signal P is provided as an input signal to a digital subtractor 78 along with a digital position command signal $P_C$. The digital position command signal $P_C$, also in the form of a twenty-bit binary number, represents the desired position to which the moveable control member 33 is to be oriented. In typical applications such as precision machine tools and computer peripheral equipment, the command signal $P_C$ is usually generated as a computer output signal.

The digital subtractor 78 subtracts the command signal $P_C$ from the actual position signal P to provide an output signal $P_E$ appearing on line 79 and representing the error between the command position and the actual position of the control member 33. This signal $P_E$, which is in digital form, is converted to an analog signal by a digital-to-analog converter 80. The output signal from the converter 80 is provided as an input signal to a power amplifier 82. The power amplifier 82 provides the motor drive signal 34 used to control the motor 32 to rotate the shaft 30 and to position the control member 33. This completes the control loop of the digital positioning system of the present invention.

As will be understood by those skilled in the art, the various digital processing functions shown in FIG. 4 may be implemented in any of a number of different ways. However, the preferred embodiment of the invention utilizes an integrated circuit microprocessor. Such integrated circuit microprocessors are well known and include all the input, output, memory, logic and control circuitry of a special purpose digital computer in miniature form. In general, such circuits have both random access memory (RAM memory) and read only memory (ROM memory). The ROM memory has connections formed by masking operations during the construction of the basic circuitry to provide a completely wired circuit which includes the program for controlling the operation of the microprocessor to perform the functions shown in FIG. 4. Such an arrangement is often described as a dedicated memory circuit. The RAM memory of the circuit is utilized for storage of the various transient bits of information and the program during the operation of the circuitry.

Figure 6:
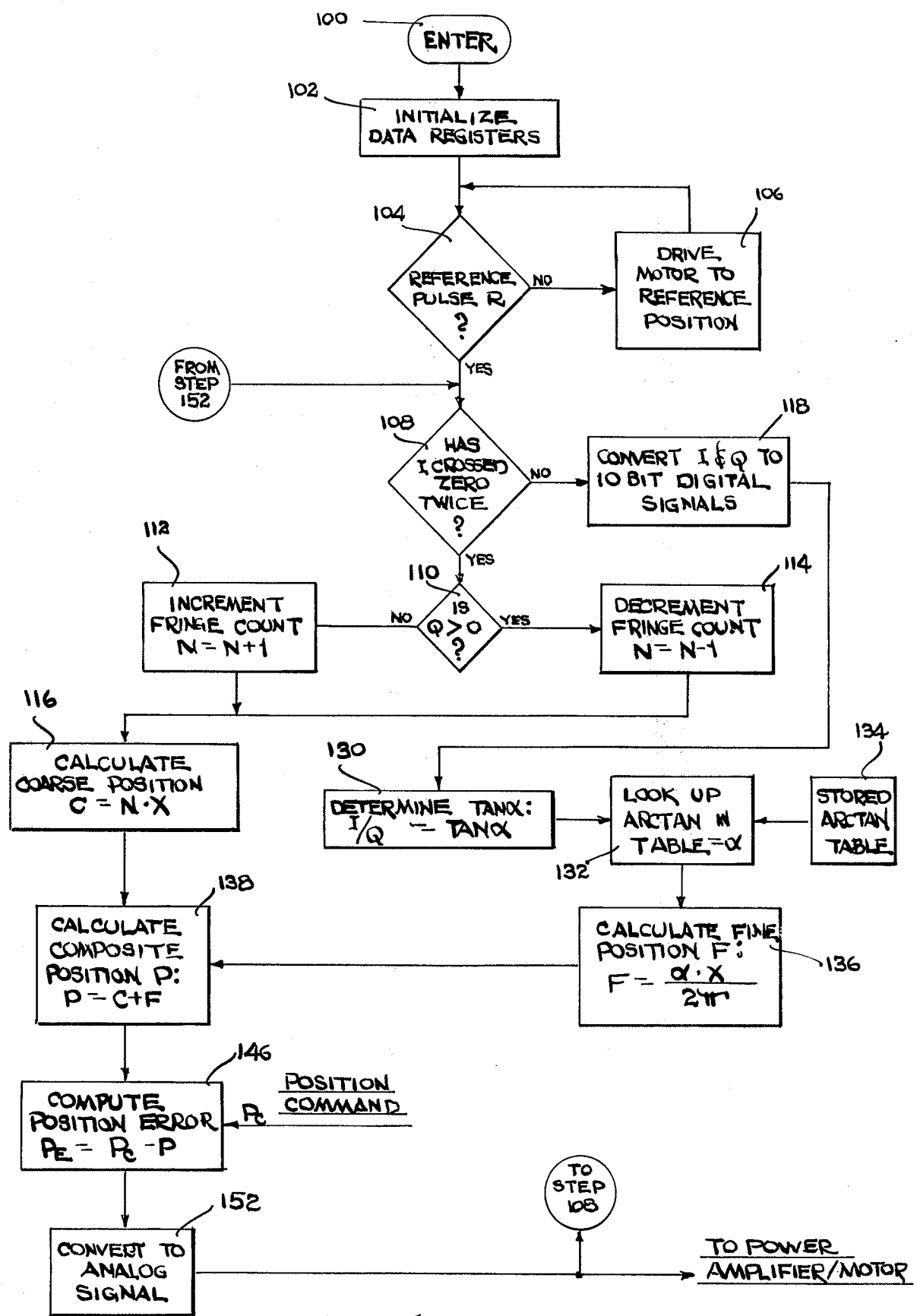
FIG. 6 is a flow chart showing the program and operation of the preferred embodiment of the digital positioning system of the present invention.

Referring now to FIG. 6, there is shown a flow chart which illustrates a program which may be used in a microprocessor to perform the functions of the digital positioning system of the present invention as shown in FIG. 4 and described above. As shown in FIG. 6, the program to control the position of control member 33 is entered at step 100. The program moves to step 102 where all of the appropriate data registers are initialized. The program then moves to step 104 to determine if a reference signal in the form of reference pulse R has been generated by the encoder 12, indicating that the shaft 30 is in the index or reference position. If the pulse R has not occurred, the program moves to step 106 where the motor 32 is commanded to rotate the shaft 30 until the reference position is reached as detected in step 104.

When the reference pulse R has occurred, the program moves to step 108 to determine if the signal I from the encoder 12 has crossed through zero twice. If the signal I has crossed through zero twice, indicating that the moveable disk 24 has rotated a distance of one fringe, the program moves to step 110 to determine the coarse position C. At step 110 the program determines if quadrature signal Q from encoder 12 is greater than zero. By determining the polarity of the signal Q when the signal I has crossed through zero twice, the program can determine the phase relationship between the signals I and Q and, thus, the direction of rotation of the moveable disk 24 as described above. In referring to FIG. 5A, which shows the signal Q lagging the signal I, it can be seen that at the end of each fringe where the signal I crosses zero, the signal Q has a negative polarity. If the direction of rotation of the motor shaft 30 were reversed, the signal Q would lead the signal I in phase by ninety degrees, causing the polarity of the signal Q to be positive at the end of each fringe.

Returning to step 110 in FIG. 6, if the polarity of the signal Q is less than zero, it is assumed that the shaft 30 is moving in an increasing direction. Accordingly, the program moves to step 112 where the number of fringes N are counted by incrementing the fringe count by one. If at step 110 it was determined that the signal Q was greater than zero, representing a decreasing direction of rotation of the shaft 30, the program moves to step 114 where the fringe count N is decremented by one. The program moves from either of steps 112 or 114 to step 116 where the coarse position signal C is provided by multiplying the fringe count N by the incremental distance X. It should be noted that the value X may be provided in any of a variety of units representing angular distance.

Returning to step 108, if it is determined that the signal I has not crossed through zero twice, indicating that the disk 24 is within a fringe, the program moves to step 118 to convert the signals I and Q to ten-bit digital signals. The program then moves at step 130 to determine the tangent of the fringe angle $\alpha$ by dividing the signal I by the signal Q. The tangent of the angle $\alpha$ is converted to the angle $\alpha$ at steps 132 and 134, which represent a digital arc tangent conversion routine 132 employing a look-up table 134 having stored arc tangent values. Once having calculated the angle $\alpha$, the program moves to step 136 where the fine position F is determined by multiplying the angle $\alpha$ by the ratio of $\chi/2\pi$. Step 138 of the program combines the coarse position signal from the step 116 with the fine position signal from the step 138 to provide the composite position signal P. The program then moves at step 146 to determine the position error signal $P_E$ as a function of the external position command signal $P_C$, and converts the error signal $P_E$ to an analog signal at step 152. Finally, this analog error signal is provided to the power amplifier 82 and the motor 32 as shown in FIG. 4, and the program returns from step 152 to close the program loop.

While the invention is thus disclosed and the presently preferred embodiment described in detail, it is not intended that the invention be limited to the shown embodiment. Instead, many modifications will occur to those skilled in the art which lie within the spirit and scope of the invention. For example, while there is shown the use of an incremental optical encoder for measuring the angular position of a control member, the system of the present invention may also be employed with incremental optical encoders configured to measure linear position, since such encoders provide the same types of output signal waveforms as described herein for angular position encoders. Further, while the preferred embodiment employs circuitry to provide a twenty-bit absolute position signal, the circuitry can be easily modified to either increase or decrease the number of bits, and hence the resolution of the position signal. It is accordingly intended that the invention be limited only by the appended claims.

What is claimed is:

1. A digital positioning system for precisely controlling the position of a dynamically moveable member, comprising:
   position sensor means for sensing an incremental position of the member, and for providing first and second sensor signals in the form of first and second periodic trigonometric functions, respectively, each representative of the incremental position of the member within a fixed interval of distance, and providing a third sensor signal representative of a reference position of the member;
   means responsive to the three sensor signals for providing a coarse position signal including means for counting the number of cycles of the first sensor signal;

means responsive to the first and second sensor signals for providing a fine position signal including means for combining the first and second sensor signals to form a third trigonometric function, and means for converting the third trigonometric function to an angle representative of the incremental position of the member within the fixed interval of distance;

means for combining the coarse and fine digital position signals to form a composite position signal representing the absolute position of the member; and means for providing a corrective signal to correct the position of the member based on the composite digital position signal.

2. The digital positioning system of claim 1 in which the means for counting the number of cycles of the first sensor signal includes:

detector means responsive to the first and third sensor signals for providing a detection signal in response to the occurrence of each cycle of the first periodic trigonometric function, beginning from the reference position;

phase detection means responsive to the first and second sensor signals for providing a direction signal representing the direction of motion of the member as a function of the phase relationship between the first and second sensor signals; and counter means responsive to the detection signal, the direction signal and the third sensor signal for counting the number of cycles of the first periodic trigonometric function, beginning from the reference position, the direction of the count being a function of the direction of motion of the member.

3. The digital positioning system of claim 1 in which the first sensor signal is in the form of a sine wave, the second sensor signal is in the form of a cosine wave, and the means for combining the first and second sensor signals to form a third trigonometric function includes means for combining the first and second sensor signals to form the tangent of the angle, and inverse trigonometric function conversion means responsive to the tangent of the angle, to derive the angle.

4. The digital positioning system of claim 3 in which the means for combining the first and second sensor signals to form the tangent of the angle includes:

means for converting the first and second sensor signals to first and second digital sensor signals; and means for dividing the first digital sensor signal by the second digital sensor signal to provide a third digital signal representing the tangent of the angle.

5. The digital positioning system of claim 4 in which the inverse trigonometric function conversion means includes means for deriving the arc-tangent in response to the third digital signal.

6. The digital positioning system of claim 1 in which the means for combining the coarse and fine position signals to form a composite position signal includes means for adding together the coarse and fine position signals, and the means for providing a corrective signal includes means for comparing the composite position signal to a command position signal to provide a position error signal proportional to the difference between the command position signal and the composite position signal.

7. The digital positioning system of claim 1 in which the position sensor means is an incremental position optical encoder.

8. Apparatus for providing a high accuracy absolute position signal from an incremental position sensor, comprising:

position sensor means for sensing an incremental position of a dynamically moveable member, the sensor providing first and second signals in the form of first and second periodic trigonometric functions, respectively, each representative of the incremental position of the member within a fixed interval of distance, and providing a third sensor signal representative of a reference position of the member;

means responsive to the three sensor signals for providing a coarse position signal including means for counting the number of cycles of the first sensor signal;

means responsive to the first and second sensor signals for providing a fine position signal including means for combining the first and second sensor signals to form a third trigonometric function, and means for converting the third trigonometric function to an angle representative of the incremental position of the member within the fixed interval of distance; and means for combining the coarse and fine digital position signals to form a composite position signal representing the absolute position of the member.

9. The apparatus of claim 8 in which the means for counting the number of cycles of the first sensor signal includes:

detector means responsive to the first and third sensor signals for providing a detection signal in response to the occurence of each cycle of the first periodic trigonometric function, beginning from the reference position;

phase detection means responsive to the first and second sensor signals for providing a direction signal representing the direction of motion of the member as a function of the phase relationship between the first and second sensor signals; and counter means responsive to the detection signal, the direction signal and the third sensor signal for counting the number of cycles of the first periodic trigonometric function, beginning from the reference position, the direction of the count being a function of the direction of motion of the member.

10. The apparatus of claim 8 in which the first sensor signal is in the form of a sine wave, the second sensor signal is in the form of a cosine wave, and the means for combining the first and second sensor signals to form a third trigonometric function includes means for combining the first and second sensor signals to form the tangent of the angle, and inverse trigonometric function conversion means responsive to the tangent of the angle, to derive the angle.

11. The apparatus of claim 8 in which the means for combining the coarse and fine position signal to form a composite position signal includes means for adding together the coarse and fine position signals.

12. The digital positioning system of claim 8 in which the position sensor means is an incremental position optical encoder.

13. A method of precisely controlling the position of a dynamically moveable member, comprising the steps of:

providing first and second sensor signals in the form of first and second periodic trigonometric functions, respectively, each representative of the incremental position of the member within a fixed interval of distance;

providing a third sensor signal representative of a reference position of the member;

counting the number of cycles of the first sensor signal in response to the three sensor signals;

combining the counted number of cycles of the first sensor signal with a quantity representing the fixed interval of distance to form a coarse position signal;

combining the first and second sensor signals to form a third trigonometric function;

converting the third trigonometric function to an angle representative of the incremental position of the member within the fixed interval of distance;

combining the angle with a quantity representing the fixed interval of distance to form a fine position signal;

combining the coarse and fine digital position signals to form a composite position signal representing the absolute position of the member; and controlling the position of the member as a function of the difference between the composite position signal and a command position signal.

14. A method of precisely controlling the position of a dynamically moveable member, comprising the steps of:

providing first and second sensor signals in the form of the sine and cosine, respectively, of an angle representative of the incremental position of the member within a fixed interval of distance;

providing a third sensor signal representative of a reference position of the member;

counting the number of cycles of the first sensor signal in response to the three sensor signals;

combining the counted number of cycles of the first sensor signal with a quantity representing the fixed interval of distance to form a coarse position signal;

combining the first and second signals to form the tangent of the angle;

converting the tangent of the angle to the angle representative of the incremental position of the member within the fixed interval of distance;

combining the angle with a quantity representing the fixed interval of distance to form a fine position signal;

combining the coarse and fine digital position signals to form a composite position signal representing the absolute position of the member; and controlling the position of the member as a function of the difference between the composite position signal and a command position signal.

15. The method of claim 14 in which the step of counting the number of cycles of the first sensor signal further includes the steps of:

detecting the occurrence of each cycle of the first sine wave to form a detection signal;

sensing the phase relationship between the first and second encoder signals to provide a direction signal; and counting the number of cycles of the first sensor signal in response to the detection signal, the direction signal and the third sensor signal, whereby the count begins from the reference position, and the direction of the count is a function of the direction of motion of the member.

16. The method of claim 14 in which the step of combining the coarse and fine position signals includes the step of digitally adding the fine position signal to the coarse position signal where the coarse position signal represents the most significant bits and the fine position signal represents the least significant bits in the addition.

17. The method of claim 12 in which the step combining the first and second sensor signals to form the tangent of the angle includes the steps of:

converting the first and second sensor signals to first and second digital sensor signals respectively; and dividing the first digital sensor signal by the second digital sensor signal to provide a third digital signal representing the tangent of the angle.

18. The method of claim 15 in which the step of converting the tangent of the angle to the angle includes the step of digitally deriving the arc tangent in response to the third digital signal.

* * * * *